(12) United States Patent
Boyer et al.

(10) Patent No.: US 6,824,675 B2
(45) Date of Patent: Nov. 30, 2004

(54) DISTRIBUTION DEVICE FOR PRODUCING A POLYPHASE MIXTURE, AND ASSOCIATED REACTOR

(75) Inventors: Christophe Boyer, Charly (FR); Vincent Coupard, Vaulx en Velin (FR); Bertrand Fanget, Vienne (FR)

(73) Assignee: Institut Francais du Petrole, Rueil Malmaison (FR)

( * ) Notice: Subject to any disclaimer, the term of this patent is extended or adjusted under 35 U.S.C. 154(b) by 500 days.

(21) Appl. No.: 09/930,201

(22) Filed: Aug. 16, 2001

(65) Prior Publication Data

US 2002/0021991 A1 Feb. 21, 2002

(30) Foreign Application Priority Data

Aug. 17, 2000 (FR) .............................................. 00 10694

(51) Int. Cl.[7] ........................ C10G 45/02; C10G 45/32; B01J 8/00
(52) U.S. Cl. .................... 208/146; 208/213; 208/254 H; 208/143; 585/250; 585/922; 585/923; 422/220; 422/224; 422/195; 137/896
(58) Field of Search ................................ 208/146, 213, 208/254 H, 143; 585/250, 922, 923; 422/220, 224, 195; 137/896

(56) References Cited

U.S. PATENT DOCUMENTS

| | | | | |
|---|---|---|---|---|
| 2,385,200 A | * | 9/1945 | Friedel ........................ | 570/252 |
| 3,946,104 A | | 3/1976 | Forster et al. .............. | 423/659 |
| 5,755,960 A | * | 5/1998 | Callebert et al. ......... | 210/198.2 |
| 5,997,826 A | | 12/1999 | Lodeng et al. .............. | 422/190 |
| 6,620,389 B1 | * | 9/2003 | Lesieur ....................... | 422/220 |
| 2002/0020359 A1 | * | 2/2002 | Boyer et al. ................ | 118/726 |

FOREIGN PATENT DOCUMENTS

FR      2 740 054      4/1997

\* cited by examiner

*Primary Examiner*—Walter D. Griffin
(74) *Attorney, Agent, or Firm*—Millen, White, Zelano & Branigan, P.C.

(57) ABSTRACT

A device for producing and distributing a polyphase mixture between two fluids comprises a chamber for the passage of a first fluid, said chamber being pierced by perforated tubes or conduits to pass a second fluid in a different physical state than the first fluid or not miscible with the first fluid through the chamber, said tubes being pierced by at least one orifice allowing passage of the first fluid and mixing between the fluids via the tubes. The second fluid is injected upstream of said device and the first fluid is injected into said device.

18 Claims, 3 Drawing Sheets

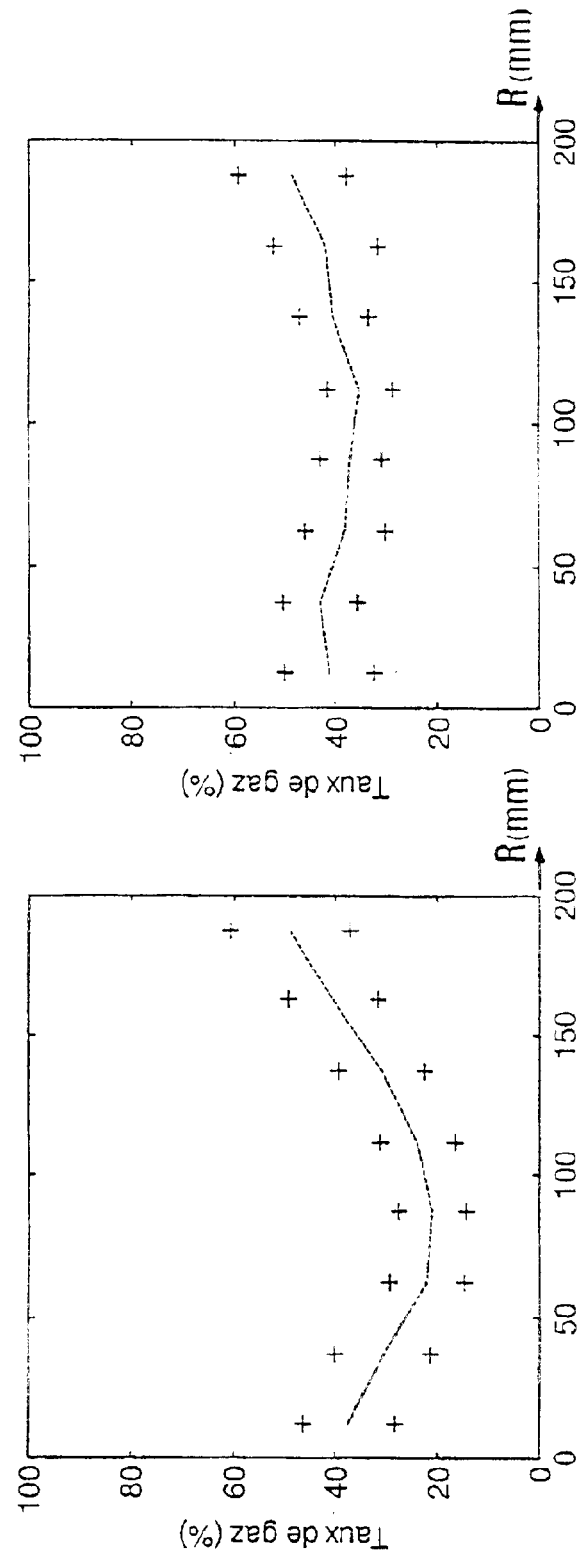

DISTRIBUTION DEVICE FOR PRODUCING A POLYPHASE MIXTURE, AND ASSOCIATED REACTOR

The present invention relates to a device for optimising mixing and distribution of two fluids constituted, for example, by an essentially gaseous phase usually at least partially comprising hydrogen and a liquid phase essentially composed of hydrocarbons, said device being located upstream of a granular bed or between two granular beds comprising solid particles, the granular solids advantageously possessing catalytic activity. Such mixing and distribution systems are generally integrated into a fixed bed reactor in which the fluid flow is in co-current dropper mode through said solid bed or beds of granular solid.

The present description will refer equally both to injection, mixing and distribution systems and to devices.

Such systems can generally be located upstream of a granular bed, more particularly at the head of a reactor.

In particular, the present invention is applicable in all cases:

- where gas phases are in the majority with respect to the liquid phases, i.e., where the volume ratio between the gas and liquids is usually more than 3:1 and normally less than 400:1 (3<gas volume/liquid volume<400);
- where the gas phases are in the minority with respect to the liquid phases, i.e., where the volume ratio between the gas and liquids is usually more than 0.1:1 and normally less than 1:1 (0.1<gas volume/liquid volume<1);
- where the reaction is highly exothermic and requires the introduction of a supplementary fluid into the reactor, usually a gas, to cool the gas/liquid mixture;
- where the reaction necessitates close contact to dissolve a compound that is usually gaseous (for example hydrogen $H_2$) in the liquid phase.

The present invention is of particular application to gas/liquid distributors such as those used to implement hydrocracking, hydrotreatment, hydrodesulphurisation, hydrodenitrogenation, selective or complete hydrogenation of $C_2$ to $C_5$ cuts, selective hydrogenation of steam cracked gasoline, hydrogenation of aromatic compounds in aliphatic and/or naphthenic cuts, and hydrogenation of olefins in aromatic cuts.

It is also of application to carrying out other reactions requiring good mixing of a gas phase with a liquid phase, for example partial or complete oxidation reactions, amination, acetyloxidation, ammoxidation and halogenation reactions, in particular chlorination.

In the specific field of hydrodesulphurisation, hydrodenitrogenation and hydrocracking reactions to produce high conversions (to obtain a product containing, for example, 30 ppm (parts per million) of sulphur or less), the distribution of both gas and liquid must be good, but principally the liquid distribution must be good, as the volume ratios are generally between about 3:1 and about 400:1, usually between about 10:1 and about 200:1; and when using a quench, very good contact between the introduced gas cools the process fluids.

In order to optimise the distribution of a fluid compound, in general at least one gas phase and at least one liquid phase, one solution proposed in the prior art consists of mixed injection gas/liquid distribution systems for dropper flows.

French patent FR-A-2 745 202 and U.S. Pat. No. 5,688,445 propose a plate with conduits provided with holes staged along the conduit for the passage of gas (upper holes) and liquid (lower holes). No system was envisaged in that prior art to prevent fluctuations in the liquid/gas interface above the plate due to injection of liquid into the head of the reactor. Because of their configuration, an imbalance in this interface causes an imbalance in the gas and liquid flows from one conduit to another.

International patent WO-A-95/35159 proposes a two-level distribution system; the second level is constituted by a plate with conduits pierced with holes in their portion located above a plate and in their portion located below the plate. The disadvantage of the plate lies in the fact that the flexibility in the liquid flow rate is obtained by employing two types of conduits. The liquid flow rate, therefore, determines the density of the injection points. Further, using two levels takes up a great deal of space in the reactor head.

U.S. Pat. No. 4,140,625 proposes a plate system traversed by venturi tubes. The gas is injected into the head of the venturi tubes and liquid is injected at the neck or upstream of the constriction. The gas/liquid mixture is then injected into the catalytic bed. The disadvantage of that system is that its flexibility is low regarding the liquid flow rate since there is only one level for the holes for the liquid.

In summary, it can be concluded that of the systems proposed in those different patents using a liquid and gas phase mixed injection plate:

- either the plate offers considerable flexibility as regards liquid flow rate but does not possess any means for stabilising the gas/liquid interface upstream of the plate;
- or the plate has two levels to amortise fluctuations in the gas/liquid interface but only has a little flexibility as regards the liquid flow rate.

In contrast to the present invention, in dropper mode gas/liquid injection systems, prior art systems are exclusively supplied by a gas/liquid flow at the reactor inlet. The system of the invention presents an alternative and innovative solution to the problems encountered with prior art devices. The flexibility of the present invention is high as regards the liquid flow rate, and fluctuations in the gas/liquid interface are absent.

The present invention provides a device for producing a polyphase mixture of two fluids and their distribution comprising a chamber for the passage of a first fluid, said chamber being pierced by perforated tubes or conduits forming a passage through the chamber for a second fluid in a physical state that is different from the first fluid or which is not miscible with the first fluid, said tubes being pierced by at least one orifice allowing the passage of the first fluid and mixing of the two fluids via the tubes, said second fluid being injected upstream of said device and the first fluid being injected into said device.

In general, the first fluid is essentially liquid and the second fluid is essentially gaseous. In a further implementation, the first fluid is essentially liquid and the second fluid is essentially a second liquid that is not miscible with the first fluid.

Advantageously, the device is located close to the reactor head.

Preferably, said chamber is supplied with the first fluid by injection thereof in a direction laterally to said device at at least one point.

In general, the second fluid is injected axially downstream of said device.

In a particular implementation, the tubes extend a distance $h_t$ below the chamber.

The invention also concerns a reactor of elongate form along one axis, comprising at least one device in accordance with the invention for mixing and distributing two fluids in different physical states, comprising at least one bed of granular solids downstream of at least one mixing and distributing device, and two separate lines for injecting fluids into said device, said first fluid being injected into said device, normally substantially perpendicularly with respect to the axis of the reactor and injection of the second fluid into said device being carried out upstream of said device, normally substantially along the axial direction of the reactor.

In a preferred implementation, the liquid and gas phases circulate in a co-current dropper mode through said bed or beds of granular solids.

More particularly, the liquid feed and gas phase can be injected upstream of said bed or beds of granular solids.

Advantageously, said bed or beds of granular solids comprise at least one catalytic granular solid.

In one implementation, the first fluid is a liquid phase and the second fluid is a gas phase.

Advantageously, upstream of the reactor head, a buffer drum is provided outside the reactor connected with the device via lines to allow material exchange between the liquid phase and the gas phase, said lines allowing separate injection into the mixing device respectively of an essentially liquid phase containing dissolved gas and of an essentially gaseous phase containing liquid, said essentially liquid and essential gaseous phases resulting from prior contact of the liquid and gas phases in said buffer drum.

The device and/or reactor described in the present invention can in particular be used in hydrodesulphurisation, selective hydrogenation or hydrodenitrogenation processes.

The term "essentially gaseous" means a phase containing at least 50% gas, preferably at least 70% gas and more preferably at least 90% gas. The term "essentially liquid" means a phase containing at least 50% liquid, preferably at least 70% liquid and more preferably at least 90% liquid.

Other advantages and characteristics of the invention will become clear from the description below given by way of example.

BRIEF DESCRIPTION OF THE DRAWINGS

FIGS. 5 A and B show distribution in systems of the invention.

Figure 2:
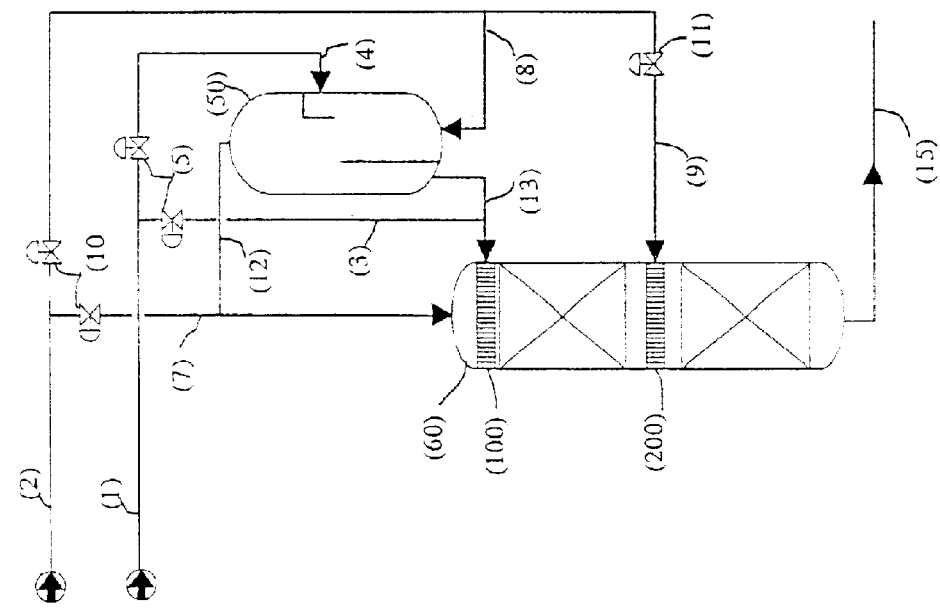
FIGS. 1 and 2 show two embodiments of a reactor that can incorporate the devices of the present invention.
Figure 1:
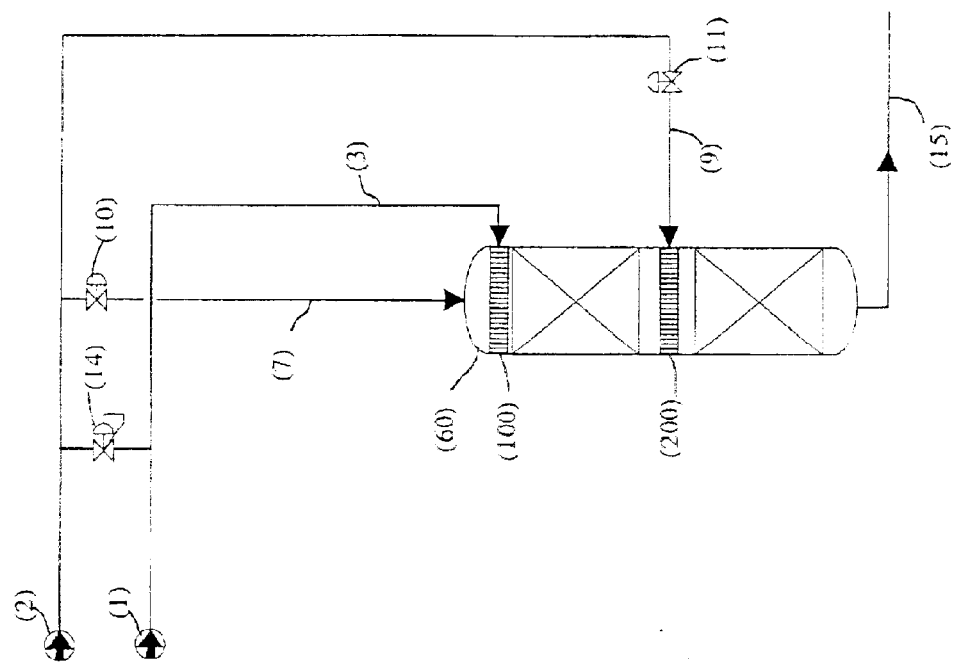

In a first embodiment of the device, an internal distribution means is located at the head of a fixed bed reactor functioning in dropper mode for liquid alone or a liquid/gas co-current. When the reactor operates in liquid/gas flow mode, the liquid feed and the gas feed are injected separately into the distribution means located at the head of the reactor and upstream of the first bed. When the reactor comprises at least two beds, a fraction of the gas injected into the reactor is injected at an intermediate level between two successive beds via the injection, mixing and distribution system described in the patent application filed by the Applicant on the same day as the present application. This first flow chart showing the distribution means of the present invention is shown in FIG. 1. Upstream of the reactor head, a drum can be added combined with a distribution system to optimise material exchange between the liquid phase and the gas phase (FIG. 2). This drum is outside the reactor. In this embodiment, the liquid feed and the gas feed are brought into contact by bubbling into this drum and leave the drum separately for separate injection into the reactor. This second scheme for using the distribution means is shown in FIG. 2.

Reactor (60) shown in FIG. 1 is a fixed bed reactor with two superimposed beds that function in co-current dropper mode.

The liquid feed (1) is injected into the vicinity of the reactor head into the distribution means (100) via line (3). The gas feed (2) is injected at two levels upstream of reactor (60): into the head of the reactor via line (7) and to an intermediate level of the reactor via line (9), via a distribution means (200) located between two successive beds. If the pressure in the liquid chamber (100) and in line (3) rises, a pressure compensation system (14) (composed of a regulating valve controlled by a differential pressure sensor) can evacuate a portion of the liquid flow to line (2) and the reactor head. The distribution of the gas flow injected into lines (7) and (9) is controlled using regulating valves (10) and (11). The gas flow injected into reactor (60) via line (7) is normally in the range 30 mole % to 70 mole % of the total molar flow rate of the gas injected into reactor (60); in line (9), this flow rate is in the range 30 mole % to 70 mole % of the total molar flow rate of the gas injected into reactor (60). Following the reaction, the product is recovered via line (15).

Reactor (60) shown in FIG. 2 is a fixed bed reactor with two superimposed beds that function in co-current dropper mode.

The liquid feed (1) is injected into the head of the reactor. The gas feed (2) is injected at two levels upstream of reactor (60): the head of the reactor via line (7) and to an intermediate level of the reactor via line (9), via a distribution means (200) located between two successive beds. To optimise material exchange between the gas feed and the liquid feed upstream of the reactor, a fraction of the gas feed injected overhead is injected via line (8) and a buffer drum (50). Distribution of the gas flow injected between lines (7), (8) and (9) is controlled using regulating valves (10) and (11). The gas flow injected into reactor (60) via line (7) is in the range 0 mole % to 70 mole % of the total molar flow of the gas injected into reactor (60); the gas flow injected via line (8) is in the range 0 mole % to 70 mole % of the total molar flow rate of the gas injected into reactor (60), and the gas flow injected via line (9) is in the range 30 mole % to 50 mole % of the total molar flow of the gas injected into reactor (60). At the buffer drum (50) outlet, the remaining gas enters the reactor inlet via lines (12) and (7) At the reactor inlet, the liquid feed can be directly injected into the distribution means (100) located at the head of the reactor via line (3), or it can be injected via line (4) into buffer drum (50) prior to rejoining the distribution means (100) via line (13). The fraction of the liquid feed flow injected into the reactor via line (4) is in the range 1% to 99% by weight of the total liquid flow injected into the reactor and the fraction of the flow of liquid feed injected into the reactor via line (3) is in the range 99% to 1% by weight of the total liquid flow rate injected into the reactor. The distribution of the injected liquid flow between lines (3) and (4) is controlled using regulating valves (5). After the reaction, the product is recovered via line (15).

Figure 3:
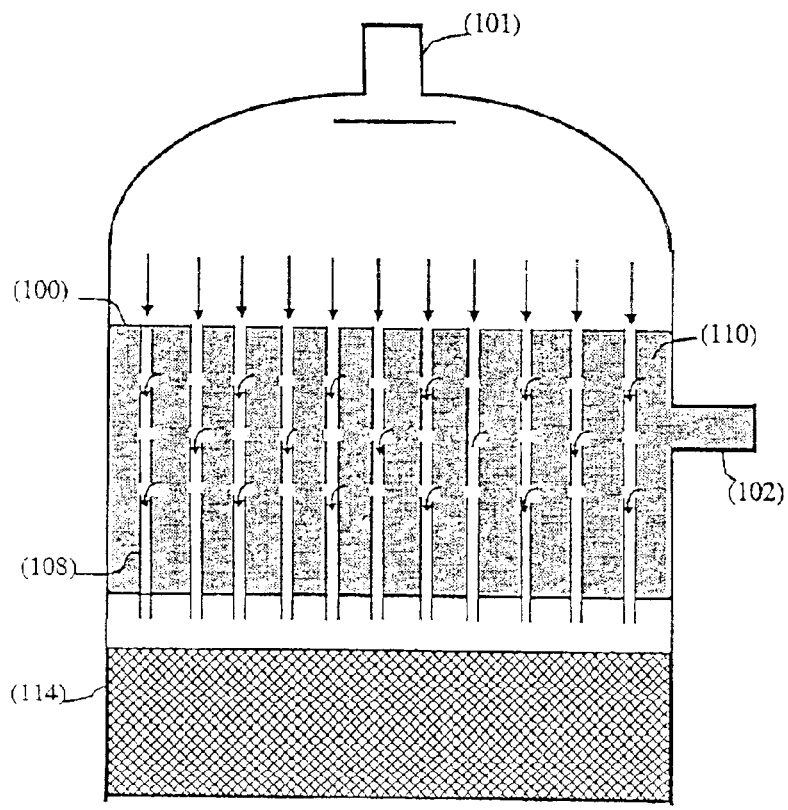
FIGS. 3 and 4 show two embodiments of a distribution system preferably located upstream of the first bed and functioning in the reactor described above.
Figure 4:
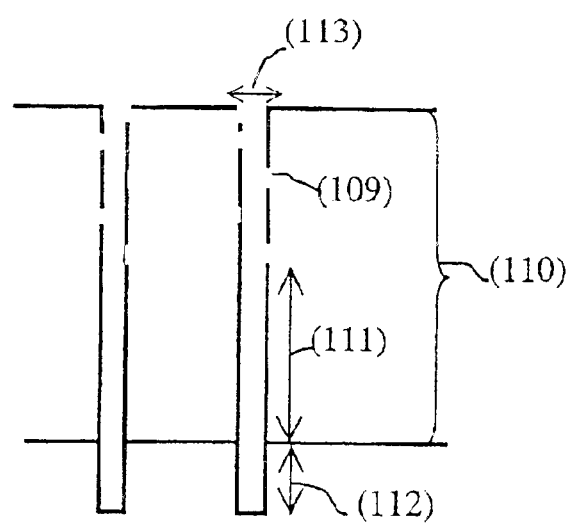

The distribution means (100) located close to the reactor head are means or systems as claimed in the present invention and illustrated, by way of example, by the embodiments described below (FIGS. 3 and 4). The distribution means located at an intermediate level of the reactor (between two successive beds) can be selected from any known prior art mixing and/or distribution device. Advantageously, the intermediate distribution systems are devices as described in the patent application filed by the Applicant on the same day as the present application.

One example of an embodiment of a distribution system located at the reactor head upstream of the first bed is shown in FIGS. 3 and 4. In this embodiment, gas is preferably injected into the mixer/distributor system axially at the reactor head through perforated tubes (108) that traverse a liquid chamber (110). This liquid chamber is supplied at at least one point by injecting the liquid feed laterally into the reactor via line (102). The operating principle consists of pre-mixing the liquid and gas phases in the conduits before injecting this mixture at different points to the inlet to the bed (114). The advantage of this device with respect to the plates described in the prior art is that it produces both a stable and constant liquid level upstream of the present system and it provides great flexibility in the liquid flow. In the present invention, the liquid level above the conduits does not depend on the liquid flow rate.

In the distribution system described in FIG. 3 and FIG. 4, the gas is injected into a mixing chamber at the reactor head via an inlet located on the axis (101) and circulates through tubes (108) disposed in parallel that traverse a liquid chamber (110). This liquid chamber is supplied by a lateral liquid inlet (102) into the reactor. Tubes (108) are pierced with a plurality of orifices (109) for the passage of liquid. Finally, the tubes (108) extend by a distance $h_t$ below the liquid chamber (110) to prevent a portion of the liquid from propagating beneath the lower outer surface of the chamber (110) and to reduce the space between the mixture injection point and the inlet to the bed.

When this chamber is supplied directly by the liquid line (FIG. 1), a variation in the liquid flow rate results in a variation in the pressure in chamber (10). In the event of abnormal operation where the pressure reaches a threshold limit in chamber (110), a pressure compensation system can evacuate a portion of the liquid flow to gas injection line (2) via a gas injection valve (14) (FIG. 1). The number and the diameter of the holes perforated in conduits (108) is calculated using techniques that are well known to the skilled person such that the chamber (110) is charged (i.e., filled with liquid) when the liquid flow is at its lowest. Chamber (110) is always filled with liquid, therefore, and there is no problem with any fluctuations in the liquid level upstream of the liquid injection points. The distance between two consecutive levels of holes is preferably at least 50 mm.

The diameter of the holes is advantageously less than 75% of the diameter of a conduit, and normally more than 2 mm. The diameter (113) of the conduit (108) is calculated using any technique known to the skilled person so that the conduit is not choked, for example so that the liquid flow rate at the bottom of the conduit is not more than $0.35\sqrt{gd_c}$, where $d_c$ is the diameter of a conduit and g is the acceleration due to gravity. The density of the conduits per square meter is preferably at least 80 conduits/$M^2$, more preferably more than 100 conduits/$M^2$ to properly distribute the gas-liquid injection points at the head of the catalytic bed. This density is generally in the range 100 to 700 conduits/$m^2$, preferably in the range 150 to 500 conduits/$m^2$. The depth below the lowest orifice (111) is generally more than 50 mm, and is preferably in the range 50 to 300 mm. This depth has the effect of prolonging the residence time of the gas-liquid mixture in the conduit and thus of optimising mass transfer between the gas (for example $H_2$) and the liquid. The conduits in the plate act as a static mixer. Finally, tubes (108) advantageously extend below the liquid chamber (110) by a distance $h_t$ (112) to prevent a portion of the liquid from propagating along the outer lower surface of the chamber (110) and to reduce the space between the mixture injection point and the inlet to the bed. The distance $h_t$ is preferably in the range 10 to 50 mm. In order to prevent separation of the liquid-gas mixture before its injection into the bed, the distance between the bottom of tubes (108) and the top of bed (114) is preferably in the range 0 to 50 mm, 0 excluded, more preferably in the range 0 to 20 mm, 0 excluded.

One embodiment of the distribution system shown in FIG. 3 was installed in a fixed bed with a diameter of 400 mm. The density of the conduits was 440 conduits/$m^2$. The conduit diameter was 15 mm, each perforated with four 4 mm diameter holes spaced 50 mm apart. The distance $h_t$ of the conduits below the liquid chamber was 30 mm. The distance between the bottom of the conduits and the inlet to the bed was 10 mm. The liquid chamber was 250 mm deep and supplied at a single point. The performance of this distribution system was tested using a gamma tomography system, which measured the distribution of the liquid and gas present inside the bed at a distance of 500 mm from the distribution system. This performance was compared, under the same gas and liquid flow conditions, with the performance obtained with a conventional distribution system constituted by 4 conduits with a diameter of 50 mm for the passage of gas and 44 holes with a diameter of 10 mm for the passage of liquid. In this second plate, the liquid and gas were injected as a co-current upstream of the plate at the reactor head. FIGS. 5 A and B shows the distribution of the gas in the bed for the two systems under consideration, respectively. The distribution system described in the present application can significantly improve the distribution of the gas flow inside the granular bed.

What is claimed is:

1. A device for mixing two fluids and distributing said mixture, comprising a chamber (110) supplied with a liquid first fluid, said chamber being filled with said first fluid, and a series of tubes or conduits (108) traversing said chamber in a substantially vertical direction and supplied with an essentially gaseous second fluid, said tubes being perforated by lateral orifices distributed over a plurality of levels allowing said tubes to communicate with said chamber, said tubes having a diameter $d_c$ in the range 3 to 100 mm for a surface velocity of the first fluid in the range 0.1 to 100 cm/s, said tubes also having a distance of more than 50 mm between orifices located at the lowest level with respect to the direction of flow of the fluid or fluid mixture at the tube outlet.

2. A device according to claim 1, in which the tubes (108) extend below the lower level of the chamber (110) by a distance $H_t$, being in the range of 10 to 50 mm.

3. A device according to claim 1, in which the distance between the level of the tube (108) outlet and an upper surface of a bed located below the device is in the range of 0 to 50 mm.

4. A device according to claim 1, comprising the tubes or conduits in a concentration of more than 80 conduits per $m^2$.

5. A device according to claim 1, located upstream of a catalytic bed or at a reactor head.

6. A device according to claim 5, located at the head of a hydrocracking, hydrotreatment, hydrodesulphurisation or C2 to C5 cut selective hydrogenation reactor.

7. A device according to claim 6, wherein the first fluid consists essentially of hydrocarbons, and the essentially gaseous second fluid is hydrogen.

8. A device according to claim 1, said device being located upstream of a bed of granular solids.

9. A device according to claim 1, further supplied with means for injecting the first fluid into the chamber laterally with respect to said device.

10. A device according to claim 1, located downstream of a bed of granular solids.

11. A reactor comprising a reactor head and at least one device according to claim 1, and further comprising at least one bed of granular solids downstream of said device, and means for introducing the first fluid directly into the chamber (110) for introducing the second fluid introduced upstream of said device.

12. A reactor according to claim 11, comprising a buffer drum located upstream of the reactor head and outside the reactor, connected with the device via lines (12, 13) to allow material exchange between the liquid phase and the gas phase, said lines allowing separate injection into the mixing device of an essentially liquid phase containing dissolved gas and of an essentially gaseous phase containing liquid respectively, said essentially liquid and essential gaseous phases resulting from prior contact of the liquid and gas phases in said buffer drum.

13. A reactor according to claim 11, comprising means for circulating the two fluids in a co-current dropper mode through said bed or beds of granular solids.

14. A process comprising conducting a hydrodesulphurisation, selective hydrogenation or hydrodenitrogenation reaction in a reactor according to claim 11.

15. A device according to claim 1, wherein the first fluid consists essentially of hydrocarbons, and the essentially gaseous second fluid is hydrogen.

16. A device for mixing two fluids and distributing said mixture, comprising a chamber (110) supplied with a liquid first fluid consisting essentially of hydrocarbons, said chamber being filled with said first fluid, and a series of tubes or conduits (108) traversing said chamber in a substantially vertical direction and supplied with an essentially gaseous second fluid consisting essentially of hydrogen, said tubes being perforated by lateral orifices distributed over a plurality of levels allowing said tubes to communicate with said chamber, said tubes having a diameter $d_c$ in the range 3 to 100 mm for a surface velocity of the first fluid in the range 0.1 to 100 cm/s, said tubes also having a distance of more than 50 mm between orifices located at the lowest level with respect to the direction of flow of the fluid or fluid mixture at the tube outlet, said device being located at the head of hydrocracking, hydrotreatment, hydrodesulphurization or C2 to C5 cut selective hydrogenation reactor.

17. A device for mixing two fluids and distributing said mixture, comprising a chamber (110) supplied with a first fluid, said chamber being filled with said first fluid, and a series of tubes or conduits (108) traversing said chamber in a substantially vertical direction and supplied with a second fluid, said tubes being perforated by lateral orifices distributed over a plurality of levels allowing said tubes to communicate with said chamber, said tubes being characterized by a diameter $d_c$ in the range 3 to 100 mm for a surface velocity of the first fluid in the range 0.1 to 100 cm/s, said tubes also being characterized in that the distance between the orifices located at the lowest level with respect to the direction of flow of the fluid or fluid mixture at the tube outlet is more than 50 mm, wherein said device is located upstream of a catalytic bed or at a reactor head.

18. A device according to claim 17, located at the head of a hydrocracking, hydrotreatment, hydrodesulphurisation or C2 to C5 cut selective hydrogenation reactor.

* * * * *